June 30, 1936. J. F. SCHOCK 2,045,677
APPARATUS FOR BALANCING MEASURING INSTRUMENTS
Filed Dec. 7, 1934
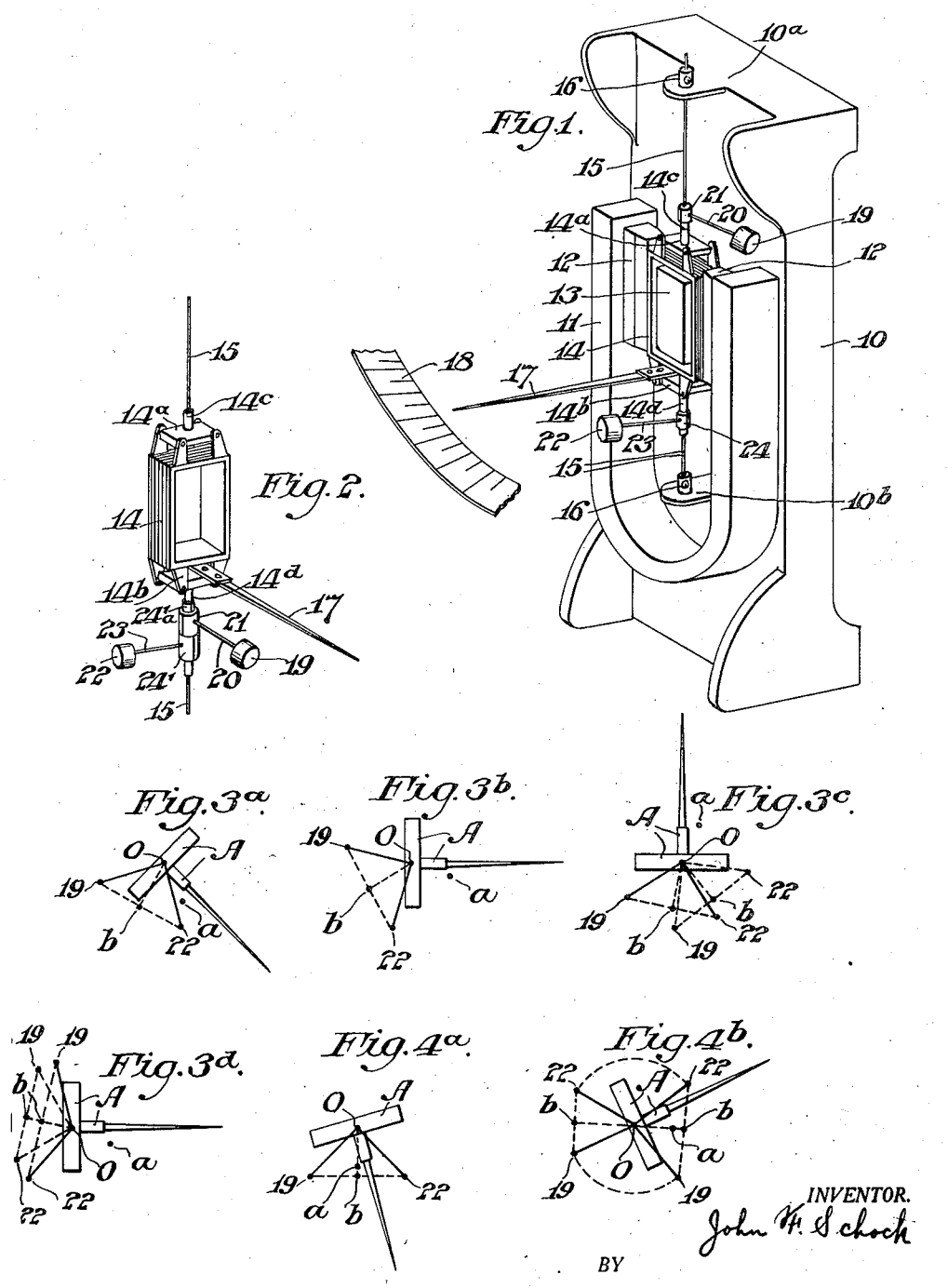

Patented June 30, 1936

2,045,677

UNITED STATES PATENT OFFICE 2,045,677

APPARATUS FOR BALANCING MEASURING INSTRUMENTS

John F. Schock, Philadelphia, Pa., assignor to Leeds and Northrup Company, Philadelphia, Pa., a corporation of Pennsylvania Application December 7, 1934, Serial No. 756,394

4 Claims. (Cl. 171—95)

My invention relates to apparatus for statically balancing the rotatable assembly of a measuring instrument, specifically, the movable coil assembly of an electrical measuring instrument, such as a moving coil galvanometer.

In accordance with my invention, the balancing of the rotatable element of a measuring instrument is accomplished with substantially no increase in its moment of inertia, which remains constant throughout the balancing operation. When balancing a plurality of similar elements in this manner, the time constants of the instruments of which they form a part are substantially unaffected, so that damping of the several instruments may be uniform. This type of balancing is accomplished by disposing the element with the axis about which it is to be balanced in a horizontal plane and adjusting the angular distribution of mass of the element to balance the element in two or more positions, at the same time maintaining constant the total mass of the element and its radial distribution.

The balancing mechanism of my invention may comprise a pair of masses supported from the element and mounted for independent movement about the balancing axis at fixed distances therefrom, the products of the masses and their respective radii to their centers of masses preferably being equal. While a given element may be balanced by a pair of masses, mounted as described above, by random movements of the masses, to produce successive balancing of the element in different positions, there are described hereinafter two specific methods of approach which are effective to simplify and shorten the balancing process.

In accordance with one method, the element, provided with a pair of equal and similar balancing masses, mounted similarly at equal and fixed distances from the balancing axis, is positioned with its balancing axis in a horizontal plane; the masses are moved through equal angles in the same direction to balance the element in a given position; the element is then moved about the balancing axis through substantially 90° and the masses moved through substantially equal angles in opposite directions to rebalance the element, the above-described cycle being repeated until a state of balance is obtained in the two positions displaced by 90°.

In accordance with another procedure embodying my invention, the element is positioned, as described above, and the masses are adjusted to balance the element in a position in which the radii from the balancing axis to the centers of gravity of the masses make equal angles with the vertical through the axis and lie on opposite sides thereof. This condition can usually be determined easily by noting the angle of the supporting arms of the masses with the vertical, which will be a very close approximation of the above condition. Thereafter, the element is moved about its axis through substantially 90° and is rebalanced by moving the masses through equal angles in opposite directions, whereupon the element will be balanced for all positions.

For a better understanding of my invention, together with other and further features thereof, reference is had to the following description taken in connection with the accompanying drawing and its scope will be pointed out in the appended claims.

Referring to the drawing, Fig. 1 illustrates in perspective a high sensitivity galvanometer including balancing means by which the method of my invention may be carried out;

Fig. 2 is a perspective of a coil unit similar to that of Fig. 1 but provided with a modified mounting for the balancing masses;

Figs. 3a to 3d are schematic diagrams of one specific method of practicing my invention, to aid in the understanding thereof; while Figs. 4a, 4b are schematic diagrams of an alternative procedure for practicing my invention.

Referring now more particularly to Fig. 1 of the drawing, there is shown a rotatable coil galvanometer comprising a supporting base or frame 10 upon which is mounted a field member illustrated as a horseshoe magnet 11, provided with a pair of pole pieces 12, between which is disposed a stationary armature 13 also supported from the base 10. The pole pieces 12 and armature 13 cooperate to form a pair of air gaps having substantially constant and uniform fields in which is mounted a movable coil structure 14 having supporting frames 14a and 14b to which are secured pillars 14c and 14d, respectively. The movable coil structure 14 is suspended by means of a pair of filamentary strands or wires 15 constituting lead-in wires for the coil 14 and secured to the posts 14c and 14d and supported from brackets or arms 10a and 10b, projecting from the frame 10, as by suitable collars and set screws 16. The galvanometer may be provided with a reflecting mirror or, as illustrated, a deflecting member or pointer 17 cooperating with a scale 18.

The balancing mechanism for the above described rotatable element comprises a weight or mass 19 supported at the end of an arm or extension 20 of relatively small cross-sectional area having a split sleeve 21 frictionally engaging the pillar or collar 14c and mounted for angular movement about the pivotal axis of the coil assembly 14. Similarly, a second balancing mass or weight 22 is attached to an arm 23 supported from a split sleeve 24 engaging the pillar 14d. By adjusting the balancing weights 19 and 22, as described hereinafter, the rotatable coil assembly 14 may be statically balanced for all positions without changing the total moment of inertia or the time constant of the rotatable assembly as a whole.

In certain instances, the balancing of the rotatable coil assembly 14 is facilitated by moving the masses 19 and 22 through equal angles in the same direction. Such a movement may be secured by the modification of Fig. 2 in which corresponding elements are identified by like reference characters. In this arrangement, one of the masses, for example, the mass 19, and its supporting arm and split sleeve 21, rather than being mounted directly upon the upper collar 14c, frictionally engages an extension of the split sleeve 24' upon which the mass 22 is supported. In this way, by moving the mass 22, the mass 19 is carried therewith so that the two masses move as a unit. At the same time, the mass 22 may be held fixed and the mass 19 moved at will, the frictional engagement between the collars 24' and 21 retaining the masses 19 and 22 in their proper relationship when released.

The principles of operation of the above described galvanometer per se are entirely familiar to those skilled in the art and need not be described here. It will be appreciated that in the manufacture and assembly of such instruments, it is impossible to locate the axis of the rotatable coil assembly 14, as determined by the engagement of the suspending filaments 15, so that the rotatable coil assembly will be statically balanced in all positions. On the other hand, if the coil 14 is not balanced, any tilting of the instrument, in use, would introduce an error into the reading of the instrument. It is clear that if the sum of the products of the masses 19 and 22 and their respective radii to their centers of gravity is equal to the product of the mass of the rotatable coil assembly and its eccentricity, the system may be balanced by properly adjusting the weights 19 and 22. This is true because of the fact that each of the weights 19 and 22 is movable through a complete 360° so that its effective components along either of any pair of rectangular reference planes including the axis of rotation of the instrument 14, may be given any plus or minus value up to and including the magnitude of the mass.

While the balancing of the above described apparatus may be effected by random movements of the masses 19 and 22 until the rotatable assembly is balanced in any position, the balancing process may be simplified and shortened by following one or the other of the following rational approaches.

Referring now particularly to Fig. 3a of the drawing, there is shown schematically the relationship of a rotatable coil assembly similar to that of Fig. 1 and represented by the character A, and the pair of balancing masses 19 and 22. It may be assumed that the center of gravity of the rotatable coil assembly A is located at the point a and that the resultant of the masses 19 and 22 may be considered as concentrated at the point b midway therebetween. If the instrument be placed so that the axis of rotation O is in a horizontal plane, Fig. 3a then represents a condition of balance. It is well known that if a pivotally mounted structure is statically balanced in both of two positions displaced by 90°, it is balanced in all positions. In such an instrument, it becomes convenient to determine the two positions, displaced by 90°, by means of the pointer 17 of the coil assembly. For example, referring to Fig. 3b, the pointer of the coil assembly A has been moved to the horizontal position and the weights 19 and 22 have been moved through equal angles, that is, as a unit, from the position of Fig. 3a to that of Fig. 3b to balance the assembly A in this position.

If, now, the assembly A be moved to the position shown in Fig. 3c, in which the positions of the masses 19 and 22 corresponding to Fig. 3b are shown in dotted lines, it will be seen that the moment of the mass of the assembly A, acting at the point a, and the resultant of the masses 19 and 22 acting at the point b, both produce clockwise torques about the axis of rotation so that the system is unbalanced. If, now, the masses 19 and 22 be moved through equal angles in a clockwise direction, that is, as a unit, to the positions shown in full line, the system again is balanced. By now returning the assembly A to its initial position, in which the pointer is horizontal as shown in Fig. 3d, leaving the masses 19 and 22 in their last positions, as shown by the dotted lines, the system is no longer balanced, for it is seen that the point of action b of the resultant of the masses 19 and 22, in Fig. 3d, is displaced from the horizontal axis by an angle smaller than that in the position of Fig. 3b so that the lever arm of the resultant of the masses is greater in Fig. 3c than in Fig. 3b, in which the system is balanced. If the masses 19 and 22 are moved through substantially equal and opposite small angles to the positions shown in full lines in Fig. 3d, the center of gravity b of the masses 19 and 22 is moved toward the axis of rotation by an amount sufficient to put the system again in balance.

It can be seen that if the system A again be returned to the position of Fig. 3c, it will be slightly out of balance, since the center of gravity of the masses 19 and 22 has been moved toward the axis of rotation and the lever arm of the resultant of these masses is slightly decreased. However, the error now is of a lower order of magnitude than that corrected by the movement indicated in Fig. 3d. This error can be corrected by a very slight movement of the masses 19 and 22 as a unit, in a clockwise direction. The above described steps can be repeated; the assembly, alternately moved between the positions shown in Figs. 3b and 3c, being balanced in one of the positions by movement of the masses 19 and 22 through equal angles in the same direction, as depicted in Fig. 3c, and in alternate positions by movement of the masses 19 and 22 through substantially equal angles in opposite directions, as illustrated in Fig. 3d. As a practical matter, the above described process need be repeated only a few times to secure an absolute balance of the system within the observable limits. In certain cases, and for certain initial positions of the balancing weights 19 and 22, the first balancing operation may be effected more easily by moving a single one of the weights and thereafter completing the balancing as described above.

In Figs. 4a and 4b are shown diagrammatically steps in balancing the rotatable coil assembly which, in certain instances, may be more expeditious. In accordance with this procedure, the masses 19 and 22 are initially placed in the position in which their radii to their centers of gravity make a substantial angle to each other less than 180°, for example, in the neighborhood of 90°, as shown in Fig. 3a. Assuming the elements to be in the relative positions of Fig. 3a, the masses 19 and 22 are moved through equal angles in the same direction, that is, as a unit, until they occupy the positions of Fig. 4a in the balanced condition of the assembly. In this position, it will be seen that the radii to the centers of gravity of the masses 19 and 22 make equal angles with the vertical and that the masses lie on opposite sides of the vertical. In the usual construction, this can easily be detected approximately by noting the positions of the supporting arms 20 and 23 of the masses 19 and 22, respectively, (see Fig. 1). With the elements in the relative positions of Fig. 4a, it is seen that the center of gravity $a$ of the system A and the center of gravity $b$ of the masses 19 and 22 both lie on the vertical. This is necessarily true, neglecting the torsion of the coil suspension, if the masses 19 and 22 are equal in magnitude and supported at fixed and equal distances from the axis of rotation or, more generally, if the products of the masses 19 and 22 and their respective radii to their centers of gravity are equal. Since the system comprising the masses 19 and 22 is symmetrical, its center of gravity $b$ must lie on the vertical bisecting the angle between their radii to their centers of masses. If this is the case, the center of gravity of the system A must also be on this vertical if the system is balanced, otherwise, the mass of the system A, acting at the center of gravity $a$, would have a component of torque about the axis of rotation which would move the system from the position indicated.

Let the structure as a whole now be moved in a counter-clockwise direction from the position shown in Fig. 4a, through 90°, to the position of Fig. 4b, the actual position of the pointer of the assembly A being immaterial. If the masses 19 and 22 are moved from their initial positions, on opposite sides of the point $a$, through equal and opposite angles to the new position shown in full lines, such that the assembly is balanced in this position, the system as a whole will now be balanced for all positions. Thus, the system has been entirely balanced by substantially only two movements of the balancing masses 19 and 22.

While I have specifically described two sequences of balancing a rotatable element in accordance with my invention, it will be readily apparent that numerous other sequences may be devised embodying the same general principle; that is, placing the element in a horizontal position and adjusting the angular distribution of the mass of the element as a whole to balance the element in a given position, moving the element substantially through 90°, and again rebalancing by varying the angular distribution of the mass of the element as a whole, at all times maintaining constant the total mass of the system and the radial distribution of mass.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim is:

1. In a measuring instrument including a rotatable element, means for mounting said element for angular movement about an axis of rotation, means for statically balancing the element about its axis of rotation comprising a mass including a radial extension supported from said element for independent movement about said axis, and a second mass including a radial extension, said first mentioned extension forming a support for said extension of said second mass for independent movement of said masses about said axis, the products of said masses and their respective radii to their centers of gravity being equal.

2. In combination, a measuring instrument provided with a movable element subject to static unbalance, means supporting said element for deflection about a given axis of rotation, said static unbalance introducing errors in the deflection of said element when the axis thereof is tilted, balancing means for said element comprising at least a pair of masses each of which includes a radial extension of relatively small cross-sectional area, the major portion of each of said masses being concentrated at one end of its radial extension, supporting means carried by the opposite ends of each of said extensions, and means rigidly secured to said element and frictionally engaged by said supporting means providing for unrestricted independent movement of said masses about said axis of rotation to positions to balance statically said element without changing the moments of inertia of said element and said balancing means.

3. In combination, a measuring instrument provided with a movable element subject to static unbalance, means supporting said element for deflection about a given axis of rotation, said static unbalance introducing errors in the deflection of said element when the axis thereof is tilted, balancing means for said element comprising at least a pair of masses each of which includes a radial extension of relatively small cross-sectional area, the major portion of each of said masses being concentrated at one end of its radial extension, supporting means carried by the opposite ends of each of said elements, one of said supporting means nesting within and frictionally engaging the other of said supporting means, and a pillar supported by said element frictionally engaged by said supporting means to retain said masses and said radial extensions in fixed positions to balance statically said element, each of said masses being movable about said axis to any given position without changing the moments of inertia of said element and said balancing means.

4. The combination with a galvanometer including a movable element subject to static unbalance, of filamentary means for supporting said element and fixing the axis of rotation thereof, at least a pair of masses, each of which includes radial extensions, and means cooperating with said element for supporting said masses and extensions for unrestricted movement, independently of each other, about the axis of rotation of said element, said means frictionally retaining said masses and extensions in fixed positions to balance statically said movable element, the products of said masses and their respective radii to their centers of gravity being equal.

JOHN F. SCHOCK.